United States Patent
Lo

(10) Patent No.: US 9,932,940 B2
(45) Date of Patent: Apr. 3, 2018

(54) GAS TURBINE ENGINE FUEL COOLED COOLING AIR HEAT EXCHANGER

(71) Applicant: HONEYWELL INTERNATIONAL INC., Morristown, NJ (US)

(72) Inventor: Charles Lo, Peoria, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 238 days.

(21) Appl. No.: 14/673,066

(22) Filed: Mar. 30, 2015

(65) Prior Publication Data
US 2016/0290290 A1    Oct. 6, 2016

(51) Int. Cl.
| | |
|---|---|
| F02M 31/20 | (2006.01) |
| F02C 7/18 | (2006.01) |
| F02C 7/224 | (2006.01) |
| F23R 3/28 | (2006.01) |
| F02C 7/14 | (2006.01) |

(Continued)

(52) U.S. Cl.
CPC .............. *F02M 31/20* (2013.01); *F02C 7/14* (2013.01); *F02C 7/185* (2013.01); *F02C 7/222* (2013.01); *F02C 7/224* (2013.01); *F23R 3/28* (2013.01); *F05D 2240/128* (2013.01); *F05D 2250/15* (2013.01); *F05D 2250/70* (2013.01); *F23D 11/24* (2013.01); *F23D 11/44* (2013.01); *F23D 2206/10* (2013.01); *F23R 3/005* (2013.01); *F23R 3/283* (2013.01); *Y02T 10/126* (2013.01); *Y02T 50/675* (2013.01)

(58) Field of Classification Search
CPC .. F23R 3/283; F23R 3/286; F23R 3/04; F23R 3/14; F02C 7/14; F02C 7/185; F02C 7/224; F23D 11/36; F02M 31/20; F05D 2250/15; F05D 2260/20; F05D 2250/25; F28D 1/0472; F28D 7/10; Y02T 50/675; Y02T 10/126

See application file for complete search history.

(56) References Cited

U.S. PATENT DOCUMENTS

| | | | | |
|---|---|---|---|---|
| 2,730,337 A | * | 1/1956 | Roswell | A23C 3/033 165/135 |
| 4,409,791 A | * | 10/1983 | Jourdain | F02C 7/222 60/240 |

(Continued)

FOREIGN PATENT DOCUMENTS

EP    2224171 A1    9/2010

OTHER PUBLICATIONS

Extended EP Search Report for Application No. 16152849.2-1607 dated Aug. 19, 2016.

(Continued)

*Primary Examiner* — Gerald L Sung
*Assistant Examiner* — Alain Chau
(74) *Attorney, Agent, or Firm* — Lorenz & Kopf, LLP

(57) ABSTRACT

A fuel cooled cooling air heat exchanger includes a fuel injector and an airflow body. The fuel injector has a fuel flow passage formed therein that includes a fuel inlet port and a fuel outlet port. The airflow body is coupled to and surrounds at least a portion of the fuel injector. The airflow body has an inner surface that is spaced apart from the fuel injector to define an airflow passage between the airflow body and the fuel injector, and the airflow passage includes an air inlet port and an air outlet port.

3 Claims, 4 Drawing Sheets

(51) Int. Cl.
*F02C 7/22* (2006.01)
*F23R 3/00* (2006.01)
*F23D 11/24* (2006.01)
*F23D 11/44* (2006.01)

(56) References Cited

U.S. PATENT DOCUMENTS

| | | | | |
|---|---|---|---|---|
| 4,938,036 | A * | 7/1990 | Hodgkins | F02M 31/20 |
| | | | | 123/541 |
| 5,351,477 | A | 10/1994 | Joshi et al. | |
| 5,735,115 | A * | 4/1998 | Maghon | F02K 3/10 |
| | | | | 60/39.826 |
| 6,067,789 | A * | 5/2000 | Dobbeling | F02C 3/20 |
| | | | | 60/39.59 |
| 6,149,075 | A * | 11/2000 | Moertle | F23D 11/36 |
| | | | | 239/132.3 |
| 6,247,317 | B1 | 6/2001 | Kostka | |
| 6,250,061 | B1 * | 6/2001 | Orlando | F01D 9/065 |
| | | | | 60/772 |
| 6,311,471 | B1 * | 11/2001 | Waldherr | F02C 3/30 |
| | | | | 60/39.55 |
| 7,231,769 | B2 | 6/2007 | Spadaccini et al. | |
| 7,766,254 | B2 * | 8/2010 | Trapasso | F02M 51/061 |
| | | | | 239/133 |
| 8,272,218 | B2 | 9/2012 | Fox et al. | |
| 8,479,518 | B1 | 7/2013 | Chen | |
| 2007/0193272 | A1 * | 8/2007 | Hebert | F23D 11/107 |
| | | | | 60/740 |
| 2010/0170253 | A1 * | 7/2010 | Berry | F23R 3/12 |
| | | | | 60/742 |
| 2011/0005232 | A1 | 1/2011 | Williams et al. | |
| 2011/0107769 | A1 | 5/2011 | Stevenson et al. | |
| 2013/0122436 | A1 * | 5/2013 | Stoia | F23R 3/286 |
| | | | | 431/12 |
| 2014/0090395 | A1 | 4/2014 | Appukuttan et al. | |
| 2014/0116066 | A1 * | 5/2014 | Melton | F23R 3/28 |
| | | | | 60/806 |
| 2014/0238036 | A1 | 8/2014 | Uhm et al. | |
| 2014/0327194 | A1 | 11/2014 | Matusewicz | |
| 2015/0135716 | A1 * | 5/2015 | Ginessin | F23R 3/28 |
| | | | | 60/737 |
| 2016/0230998 | A1 * | 8/2016 | Frish | F02C 7/18 |

OTHER PUBLICATIONS

Huang, H. et al.; Fuel-Cooled Thermal Management for Advanced Aeroengines; vol. 126, Apr. 2004 Copyright © 2004 by ASME Transactions of the ASME.

Jason Jian Liang; Design and Development of an Experimental Apparatus to Study Jet Fuel Coking in Small Gas Turbine Fuel Nozzles; A thesis submitted in conformity with the requirements for the degree of Master of Applied Science Graduate Department of Aerospace Science and Engineering University of Toronto, © Copyright 2013.

EP Examination Report for Application No. 16152849.0-1607 dated May 15, 2017.

* cited by examiner

GAS TURBINE ENGINE FUEL COOLED COOLING AIR HEAT EXCHANGER

STATEMENT REGARDING FEDERALLY SPONSORED RESEARCH OR DEVELOPMENT

This invention was made with Government support under FA8650-09-D-2925-003 awarded by the U.S. Air Force Research Laboratory. The Government has certain rights in this invention.

TECHNICAL FIELD

The present invention generally relates to heat exchangers, and more particularly relates to a fuel cooled cooling air heat exchanger that may be mounted on a gas turbine engine combustor.

BACKGROUND

In the field of gas turbine technology a great deal of effort has been, and continues to be, directed toward improving thermodynamic efficiency by operating gas turbine engines at ever increasing temperatures. These temperatures may exceed the temperatures that some materials within the turbine engine structure can normally tolerate. As such, cooling air may be provided to various turbine engine components using cooling air extracted from other parts of the engine. For example, in some gas turbine engines cooling air is extracted from a plenum at the discharge of the compressor, and is then directed to certain portions of the turbine.

For some gas turbine engines, the air that is extracted from the engine for turbine cooling may be at temperatures that require the air to be cooled before being directed to the turbine. Depending on the type of gas turbine engine, a portion of the fan air flowing in the bypass duct or a portion of the engine bleed air may be continuously redirected and used to cool the extracted turbine cooling air. These configurations can, however, exhibit certain drawbacks. For example, these configurations can result in parasitic losses to overall engine performance and/or increase the risk of a highly unlikely, yet postulated heat exchanger leak.

Hence, there is a need for system and method for cooling air that is extracted from the engine and that is used for turbine cooling that exhibits less parasitic losses to overall engine performance and/or decreases (or eliminates) the risk of a highly unlikely, yet postulated heat exchanger leak, while simultaneously increasing engine specific fuel consumption (SFC) by recuperating heat into the cycle via the fuel, which may or may not be deoxygenated. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fuel cooled cooling air heat exchanger includes a fuel injector and an airflow body. The fuel injector has a fuel flow passage formed therein that includes a fuel inlet port and a fuel outlet port. The airflow body is coupled to and surrounds at least a portion of the fuel injector. The airflow body has an inner surface that is spaced apart from the fuel injector to define an airflow passage between the airflow body and the fuel injector, and the airflow passage includes an air inlet port and an air outlet port.

In another embodiment, an assembly includes a gas turbine engine combustor and a plurality of fuel cooled cooling air heat exchangers. The gas turbine engine combustor has an inner surface that defines a combustion chamber. The fuel cooled cooling air heat exchangers are coupled to the combustor, and each fuel cooled cooling air heat exchanger includes a fuel injector and an airflow body. The fuel injector has a fuel flow passage formed therein that includes a fuel inlet port and a fuel outlet port. The fuel inlet port is adapted to receive a flow of fuel, and the fuel outlet port is disposed in the combustion chamber. The airflow body is coupled to and surrounds at least a portion of the fuel injector. The airflow body has an inner surface that is spaced apart from the fuel injector to define an airflow passage between the airflow body and the fuel injector. The airflow passage includes an air inlet port and an air outlet port.

In yet another embodiment, a gas turbine engine includes a compressor section, a combustion section, and a turbine section disposed in flow series, the combustion section configured to receive a flow of compressed air and a flow of fuel. The combustion section includes a combustor, a plurality of fuel cooled cooling air heat exchangers. The combustor has an inner surface that defines a combustion chamber. Each fuel cooled cooling air heat exchanger includes a fuel injector and an airflow body. The fuel injector has a fuel flow passage formed therein that includes a fuel inlet port and a fuel outlet port. The fuel inlet port is adapted to receive the flow of fuel, and the fuel outlet port is disposed in the combustion chamber. The airflow body is coupled to and surrounds at least a portion of the fuel injector. The airflow body has an inner surface that is spaced apart from the fuel injector to define an airflow passage between the airflow body and the fuel injector. The airflow passage includes an air inlet port and an air outlet port. The air inlet port is adapted to receive a portion of the flow of compressed air.

Furthermore, other desirable features and characteristics of the fuel cooled cooling air heat exchanger will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
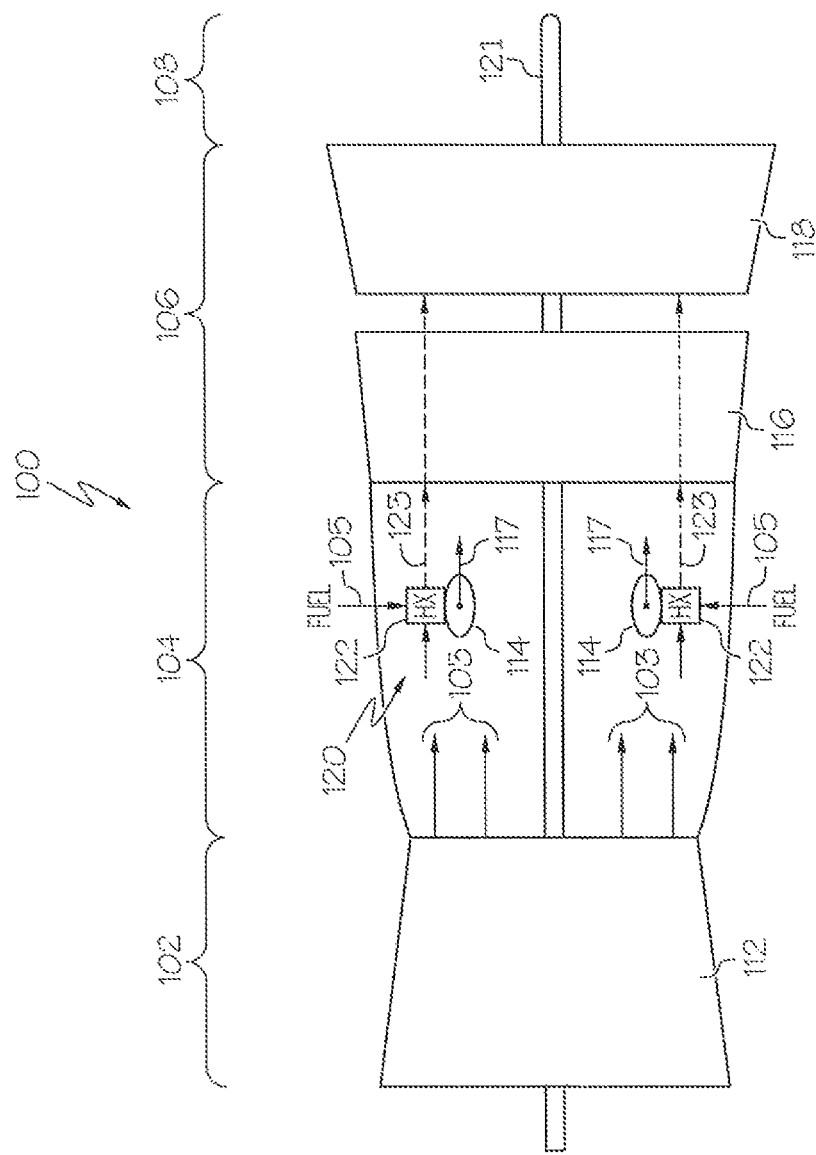
FIG. 1 depicts a simplified functional representation of an embodiment of a gas turbine engine.

Turning now to FIG. 1, a simplified functional representation of one embodiment of a gas turbine engine 100 is depicted. The depicted engine 100 is a dual-spool turboshaft gas turbine propulsion engine, and includes a compressor section 102, a combustion section 104, a turbine section 106, and an exhaust section 108. The compressor section 102, which may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air 103 that is discharged from the compressor section 102 is directed into the combustion section 104. In the combustion section 104, which includes a combustor assembly 114, the compressed air 103 is mixed with fuel 105 that is supplied to the combustor assembly 114 from a non-illustrated fuel source. The fuel may be deoxygenated fuel or non-deoxygenated fuel. Regardless, the fuel and air mixture is combusted, and the high energy combustion product 117 is then directed into the turbine section 106.

The turbine section 106 includes one or more turbines. In the depicted embodiment, the turbine section 106 includes two turbines, a high pressure turbine 116 and a low power turbine 118. However, it will be appreciated that the engine 100 could be configured with more or less than this number of turbines. No matter the particular number, the combustion product 117 from the combustion section 104 expands through each turbine 116, 118, causing it to rotate a power shaft 121. The combustion product 117 is then exhausted via the exhaust section 108. The power shaft 121 may be used to drive various devices within the engine or vehicle. For example, in the context of a helicopter, the power shaft may be used to drive one or more rotors.

During operation, the temperatures within various portions of the engine 100 may reach relatively high temperatures. Thus, as FIG. 1 also depicts, the engine 100 includes a cooling air system 120 to provide cooling air to these various components within the engine 100. The cooling air system 120 directs a portion of the relatively hot air 103 that is discharged from the compressor section 102 through one or more heat exchangers 122. Fuel 105 is also supplied, from the non-illustrated fuel source, to each of the one or more heat exchangers 122. As the air 103 and fuel 105 flow through the heat exchangers 122, the air 103 is cooled by the fuel 105, and the fuel 105 is concomitantly heated. The cooled air 123 is then directed into the turbine section 106 to provide cooling air to one or both turbines 116, 118, and the heated fuel is supplied to the combustor assembly 114. One embodiment of a fuel cooled cooling air heat exchanger 122, is depicted in FIGS. 2 and 3, and with reference thereto will now be described.

Figure 2:
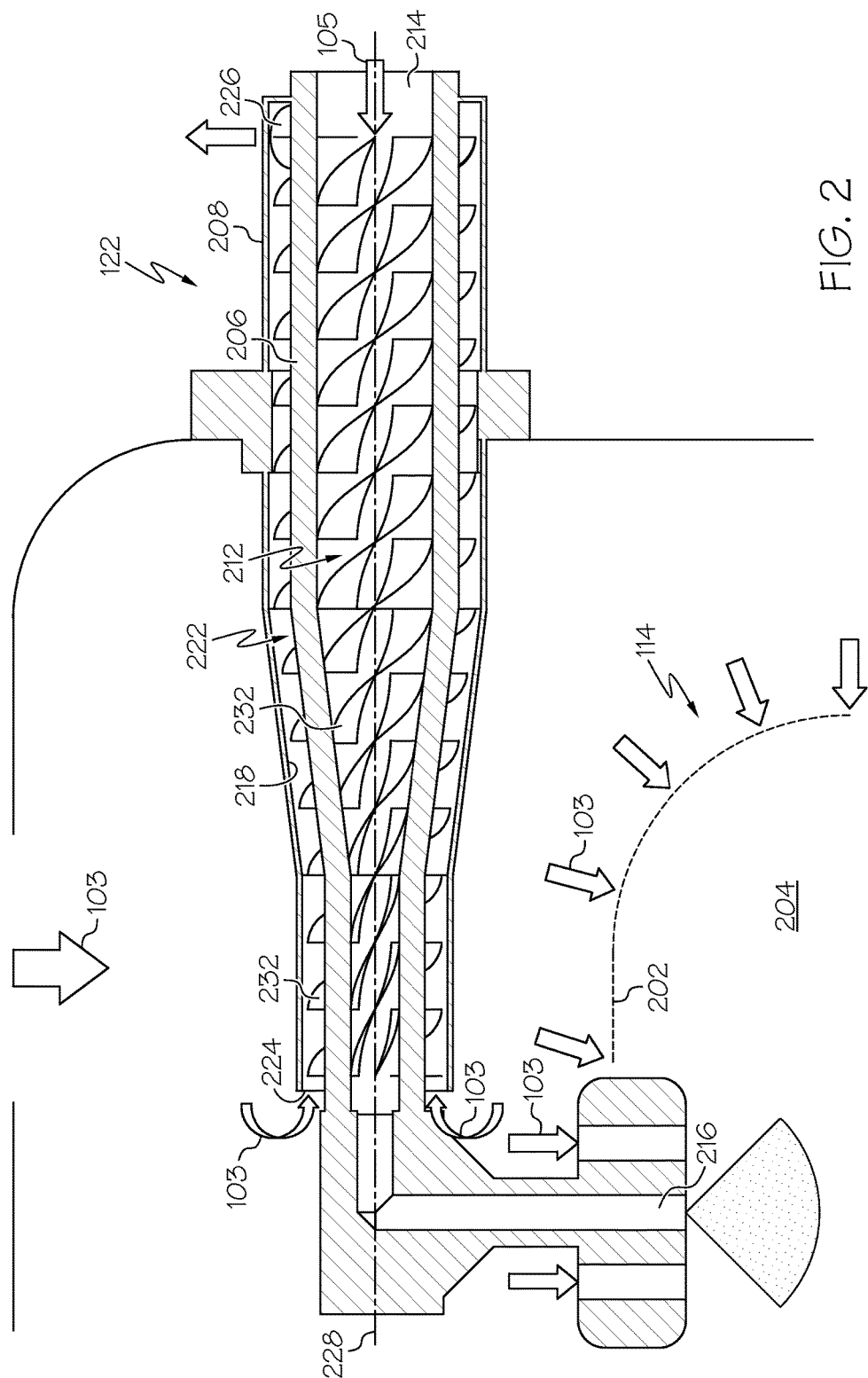
FIG. 2 depicts a cross section view of one embodiment of a fuel cooled cooling air heat exchanger mounted in a combustion section of the engine of FIG. 1.
Figure 3:
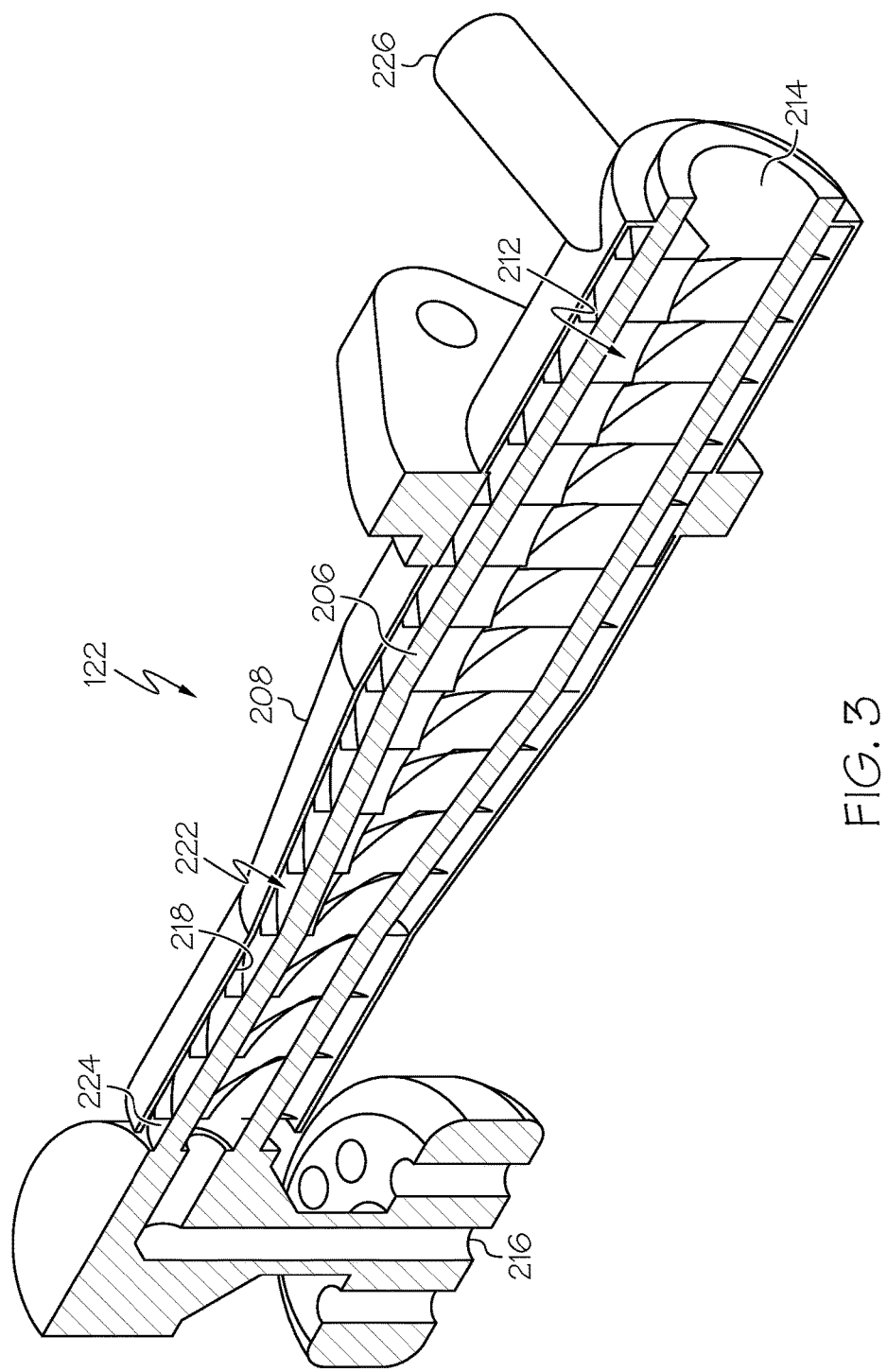
FIG. 3 depicts another view of the fuel cooled cooling air heat exchanger of FIG. 2 apart from the combustion section.

Referring first to FIG. 2, the fuel cooled cooling air heat exchanger 122 is shown mounted in the combustion section 104 of the engine 100. The combustion section 104, as noted above, includes a combustor 114. The combustor 114, as is generally known, has an inner surface 202 that defines a combustion chamber 204. As was also noted above, compressed air is supplied to the combustor 114 from the compressor section 102, and fuel is supplied the combustor 114 from the non-illustrated fuel source. The air and fuel are mixed and ignited within the combustion chamber 204.

The fuel cooled cooling air heat exchangers 122 (only one depicted in FIG. 2) are each coupled to the combustor 114, and each includes a fuel injector 206 and an airflow body 208. The fuel that is supplied to the combustor 114 is supplied via the fuel injector 206, and more specifically via a fuel flow passage 212 that is formed in the fuel injector 206. The fuel flow passage 212 includes a fuel inlet port 214 and a fuel outlet port 216, and is preferably configured as a spiral flow passage. The fuel inlet port 214 is adapted to receive a flow of fuel from the non-illustrated fuel source, and the fuel outlet port 216 is disposed in the combustion chamber 204. As FIG. 2 depicts, the fuel outlet port 216 may, in some embodiments, be formed as, or include, a fuel spray nozzle to generate a fuel spray pattern into the combustion chamber 204.

The airflow body 208 is coupled to and surrounds at least a portion of the fuel injector 206. The airflow body 208 includes an inner surface 218 that is spaced apart from the fuel injector 206 to define an airflow passage 222 between the airflow body inner surface 218 and the fuel injector 206. The airflow passage 222 includes an air inlet port 224 and an air outlet port 226, and is also preferably configured as a spiral flow passage.

In the depicted embodiment, the fuel cooled cooling air heat exchanger 122 is configured as a counter flow heat exchanger. As such, the fuel inlet port 214 is disposed closer to the air outlet port 226 than it is to the air inlet port 224, and the fuel outlet port 216 is disposed closer to the air inlet port 224 than it is to the air outlet port 226. Moreover, the fuel flow passage 212 and the airflow passage 222 are configured such that the fuel and air flow through these passages 212, 222 in opposite spiral directions. That is, the fuel flow passage 212 is configured to cause the fuel to flow, from the fuel inlet port 214 to the fuel outlet port 216, in a first direction about a longitudinal axis 228, and the airflow passage 222 is configured to cause the air to flow, from the air inlet port 224 to the air outlet port 226, in a second direction about the longitudinal axis 228 that is opposite the first direction.

Figure 4:
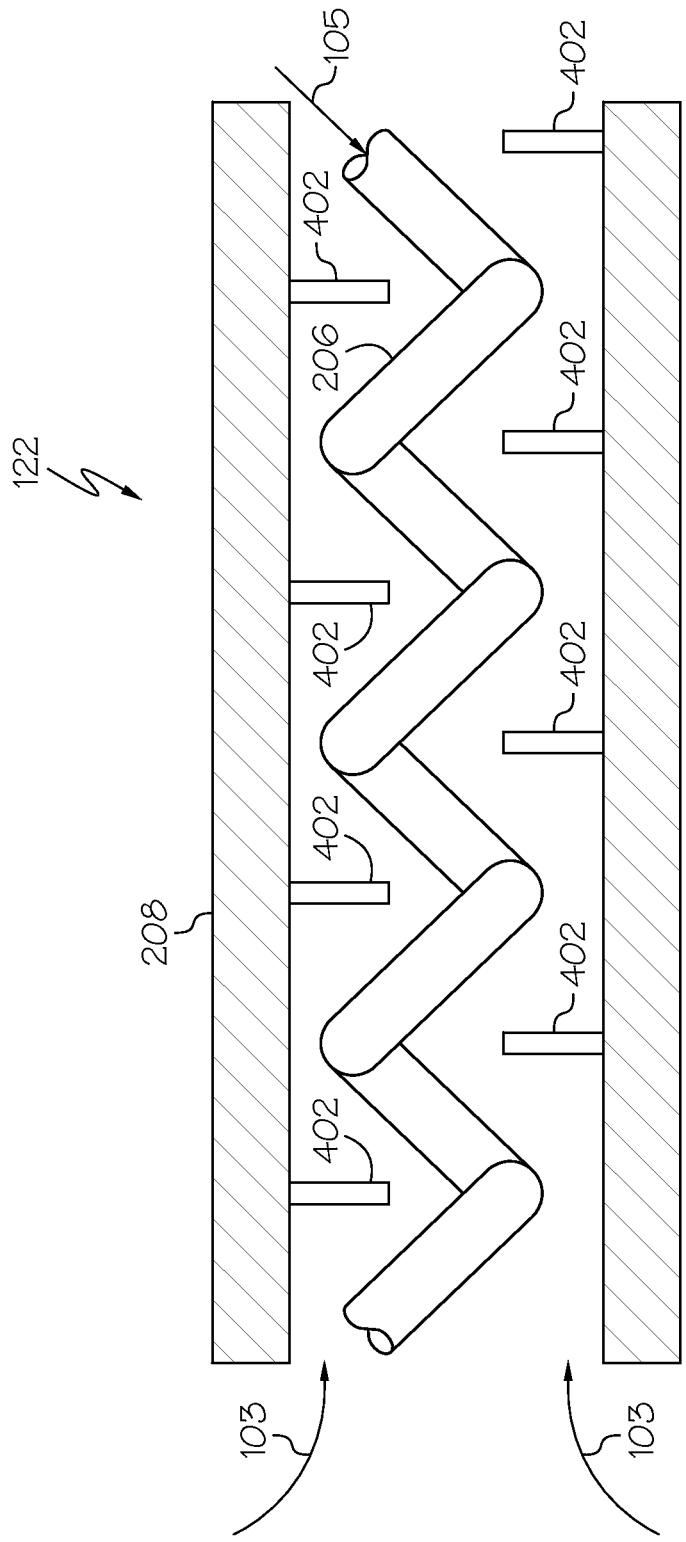
FIG. 4 depicts a cross section view of a portion of an alternative embodiment of a fuel cooled cooling air heat exchanger.

It will be appreciated that that the fuel flow passage 212 and the airflow passage 222 may be variously configured to implement spiral flow passages. For example, in the embodiment depicted in FIGS. 2 and 3, the flow passages 212, 222 are configured as spiral flow passages by including a plurality of spiral fins or turbulators 232 within each flow passage 212, 222. In another embodiment, which is depicted in FIG. 4, the fuel injector 206 is configured as a spiral tube or conduit, and may additionally include fins or dimples, thereby implementing the spiral flow passage. With this embodiment, the airflow passage 222 may be implemented as a spiral or non-spiral flow passage via a plurality of fins 402 that extend from the inner surface 218 of the airflow body 208 into the airflow passage 222 and toward the fuel injector 206.

The fuel cooled cooling air heat exchanger 122 described herein uses fuel (either deoxygenated or non-deoxygenated) to cool that at the combustor assembly 114. Heat transferred into the fuel is then recycled into the engine cycle to improve the SFC (specific fuel consumption). The fuel cooled cooling air heat exchanger 122 also provides cooled cooling air to improve engine performance and power density. In some embodiments, the cooled cooling air can also be joined with some un-cooled cooling air, at a reduced flow, to avoid excessive pressure drop.

It should be noted that the fuel cooled cooling air heat exchange described herein can occur at any one of numerous locations. However, to minimize hot surface contact time, to thereby avoid coking, the heat exchange preferably takes place at the last possible location before the fuel is combusted.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:
   a compressor section, a combustion section, and a turbine section disposed in flow series, the combustion section configured to receive a flow of fuel and to also receive a flow of compressed air from the compressor section, the combustion section comprising:
   a combustor having an inner surface that defines a combustion chamber; and
   a plurality of fuel cooled cooling air heat exchangers mounted within the combustion section and coupled to the combustor, each fuel cooled cooling air heat exchanger comprising:
      a fuel injector having a fuel flow passage and a plurality of air injection passages formed therein, the fuel flow passage including a fuel inlet port and a fuel outlet port, the fuel inlet port adapted to receive the flow of fuel, the fuel outlet port disposed in the combustion chamber, each of the air injection passages configured to direct a first portion of the flow of compressed air from the compressor section into the combustion chamber; and
      an airflow body coupled to and surrounding at least a portion of the fuel injector within the combustion section, the airflow body having an inner surface that is spaced apart from the fuel injector to define an airflow passage between the airflow body and the fuel injector, the airflow passage including an air inlet port and an air outlet port, the air inlet port adapted to receive a second portion of the flow of compressed air from the compressor section from within the combustion section,
   wherein:
      the fuel flow passage is configured as a spiral fuel flow passage that causes fuel to flow, from the fuel inlet port to the fuel outlet port, in a first direction along a longitudinal axis that extends through the fuel injector;
      the airflow passage is fluidly isolated from the fuel flow passage and is configured as a spiral airflow flow passage that causes air to flow, from the air inlet port to the air outlet port, in a second direction along the longitudinal axis that extends through the fuel injector, the second direction being opposite the first direction; and
      air discharged from the air outlet port is directed into the turbine section as a cooling airflow.

2. The gas turbine engine of claim 1, further comprising:
plurality of fins extending from the airflow body into the airflow passage and toward the fuel injector.

3. The gas turbine engine of claim 1, wherein:
the fuel inlet port is disposed closer to the air outlet port than it is to the air inlet port; and
the fuel outlet port is disposed closer to the air inlet port than it is to the air outlet port.

\* \* \* \* \*